United States Patent
Chong et al.

(10) Patent No.: US 9,544,219 B2
(45) Date of Patent: Jan. 10, 2017

(54) GLOBAL VLAN SERVICES

(71) Applicant: BROCADE COMMUNICATIONS SYSTEMS, INC., San Jose, CA (US)

(72) Inventors: Chi Lung Chong, Fremont, CA (US); Ganesh D. Venkata, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/815,487

(22) Filed: Jul. 31, 2015

(65) Prior Publication Data
US 2016/0036774 A1    Feb. 4, 2016

Related U.S. Application Data

(60) Provisional application No. 62/031,746, filed on Jul. 31, 2014.

(51) Int. Cl.
*H04L 12/28* (2006.01)
*H04L 12/751* (2013.01)
(Continued)

(52) U.S. Cl.
CPC .............. *H04L 45/02* (2013.01); *G06F 9/455* (2013.01); *G06F 9/45558* (2013.01);
(Continued)

(58) Field of Classification Search
None
See application file for complete search history.

(56) References Cited

U.S. PATENT DOCUMENTS

| 829,529 A | 8/1906 | Keathley |
| 5,390,173 A | 2/1995 | Spinney |

(Continued)

FOREIGN PATENT DOCUMENTS

| CN | 102801599 A | 11/2012 |
| EP | 0579567 | 5/1993 |

(Continued)

OTHER PUBLICATIONS

Office action dated Feb. 2, 2016, U.S. Appl. No. 13/092,460, filed Apr. 22, 2011.
(Continued)

*Primary Examiner* — Edan Orgad
*Assistant Examiner* — Rebecca Song
(74) *Attorney, Agent, or Firm* — Shun Yao; Park, Vaughan, Fleming & Dowler LLP

(57) ABSTRACT

One embodiment of the present invention provides a switch in a network of interconnected switches. The switch includes a forwarding domain apparatus and a forwarding apparatus. The forwarding domain apparatus maintains a mapping between a first virtual local area network (VLAN) identifier and a first global VLAN identifier in a local storage device. The global VLAN identifier represents a layer-2 forwarding domain in the network and is distinct from a customer VLAN or a service-provider VLAN. The mapping is independent of a type of the VLAN identifier. During operation, the forwarding apparatus encapsulates a first packet belonging to the first VLAN in a network encapsulation header. The encapsulated packet is forwardable in the network based on the network encapsulation header. The forwarding apparatus includes the first global VLAN identifier in the network encapsulation header of the first packet.

21 Claims, 10 Drawing Sheets

(51) Int. Cl.
*G06F 9/455* (2006.01)
*H04L 12/46* (2006.01)
*H04L 29/12* (2006.01)

(52) U.S. Cl.
CPC .. *H04L 12/465* (2013.01); *G06F 2009/45595* (2013.01); *H04L 61/2038* (2013.01); *H04L 61/6022* (2013.01)

(56) References Cited

U.S. PATENT DOCUMENTS

| | | |
|---|---|---|
| 5,802,278 A | 9/1998 | Isfeld |
| 5,878,232 A | 3/1999 | Marimuthu |
| 5,959,968 A | 9/1999 | Chin |
| 5,973,278 A | 10/1999 | Wehrill, III |
| 5,983,278 A | 11/1999 | Chong |
| 6,041,042 A | 3/2000 | Bussiere |
| 6,085,238 A | 7/2000 | Yuasa |
| 6,104,696 A | 8/2000 | Kadambi |
| 6,185,214 B1 | 2/2001 | Schwartz |
| 6,185,241 B1 | 2/2001 | Sun |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,633,761 B1 | 10/2003 | Singhal |
| 6,771,610 B1 | 8/2004 | Seaman |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | Jha |
| 8,599,864 B2 | 12/2013 | Chung |
| 8,615,008 B2 | 12/2013 | Natarajan |
| 8,706,905 B1 | 4/2014 | McGlaughlin |
| 8,724,456 B1 | 5/2014 | Hong |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,995,272 B2 | 3/2015 | Agarwal |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0091795 A1 | 7/2002 | Yip |
| 2003/0041085 A1 | 2/2003 | Sato |
| 2003/0123393 A1 | 7/2003 | Feuerstraeter |
| 2003/0147385 A1 | 8/2003 | Montalvo |
| 2003/0174706 A1 | 9/2003 | Shankar |
| 2003/0189905 A1 | 10/2003 | Lee |
| 2003/0208616 A1 | 11/2003 | Laing |
| 2003/0216143 A1 | 11/2003 | Roese |
| 2004/0001433 A1 | 1/2004 | Gram |
| 2004/0003094 A1 | 1/2004 | See |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1* | 4/2004 | Finn ............... H04L 12/462 370/395.53 |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |

(56) References Cited

U.S. PATENT DOCUMENTS

| | | |
|---|---|---|
| 2005/0122979 A1 | 6/2005 | Gross |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0036765 A1 | 2/2006 | Weyman |
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0093254 A1 | 5/2006 | Mozdy |
| 2006/0098589 A1 | 5/2006 | Kreeger |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2007/0036178 A1 | 2/2007 | Hares |
| 2007/0053294 A1 | 3/2007 | Ho |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0211712 A1 | 9/2007 | Fitch |
| 2007/0258449 A1 | 11/2007 | Bennett |
| 2007/0274234 A1 | 11/2007 | Kubota |
| 2007/0289017 A1 | 12/2007 | Copeland, III |
| 2008/0052487 A1 | 2/2008 | Akahane |
| 2008/0056135 A1 | 3/2008 | Lee |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245137 A1 | 10/2009 | Hares |
| 2009/0245242 A1 | 10/2009 | Carlson |
| 2009/0246137 A1 | 10/2009 | Hadida |
| 2009/0252049 A1 | 10/2009 | Ludwig |
| 2009/0252061 A1 | 10/2009 | Small |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0027420 A1 | 2/2010 | Smith |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0257263 A1 | 10/2010 | Casado |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |

(56) References Cited

U.S. PATENT DOCUMENTS

| | | |
|---|---|---|
| 2010/0329110 A1 | 12/2010 | Rose |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0055274 A1 | 3/2011 | Scales et al. |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | VanDerMerwe |
| 2011/0142062 A1 | 6/2011 | Wang |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | Ee |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0177039 A1 | 7/2012 | Berman |
| 2012/0210416 A1* | 8/2012 | Mihelich ............ H04L 63/0218 726/11 |
| 2012/0243539 A1 | 9/2012 | Keesara |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1* | 2/2013 | Jaiswal ............ H04L 12/4641 370/255 |
| 2013/0067466 A1 | 3/2013 | Combs |
| 2013/0070762 A1 | 3/2013 | Adams |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0136123 A1* | 5/2013 | Ge ............ H04L 12/4645 370/390 |
| 2013/0148546 A1 | 6/2013 | Eisenhauer |
| 2013/0194914 A1 | 8/2013 | Agarwal |
| 2013/0219473 A1 | 8/2013 | Schaefer |
| 2013/0250951 A1 | 9/2013 | Koganti |
| 2013/0259037 A1 | 10/2013 | Natarajan |
| 2013/0272135 A1 | 10/2013 | Leong |
| 2013/0294451 A1 | 11/2013 | Li |
| 2013/0301642 A1 | 11/2013 | Radhakrishnan |
| 2013/0346583 A1* | 12/2013 | Low ............ H04L 12/4641 709/223 |
| 2014/0013324 A1 | 1/2014 | Zhang |
| 2014/0025736 A1 | 1/2014 | Wang |
| 2014/0044126 A1 | 2/2014 | Sabhanatarajan |
| 2014/0056298 A1 | 2/2014 | Vobbilisetty |
| 2014/0105034 A1 | 4/2014 | Sun |
| 2015/0010007 A1* | 1/2015 | Matsuhira ............ H04L 12/4633 370/392 |
| 2015/0030031 A1* | 1/2015 | Zhou ............ H04L 12/4625 370/395.53 |
| 2015/0143369 A1* | 5/2015 | Zheng ............ H04L 12/4645 718/1 |

FOREIGN PATENT DOCUMENTS

| | | |
|---|---|---|
| EP | 0579567 A2 | 1/1994 |
| EP | 0993156 A2 | 12/2000 |
| EP | 1398920 A2 | 3/2004 |
| EP | 1916807 A2 | 4/2008 |
| EP | 2001167 A1 | 10/2008 |
| WO | 2008056838 | 5/2008 |
| WO | 2009042919 | 4/2009 |
| WO | 2010111142 A1 | 9/2010 |
| WO | 2014031781 | 2/2014 |

OTHER PUBLICATIONS

Office Action dated Feb. 2, 2016. U.S. Appl. No. 14/154,106, filed Jan. 13, 2014.

Office Action dated Feb. 3, 2016, U.S. Appl. No. 13/098,490, filed May 2, 2011.

Office Action dated Feb. 4, 2016, U.S. Appl. No. 13/557,105, filed Jul. 24, 2012.

Office Action dated Feb. 11, 2016, U.S. Appl. No. 14/488,173, filed Sep. 16, 2014.

Office Action dated Feb. 24, 2016, U.S. Appl. No. 13/971,397, filed Aug. 20, 2013.

Office Action dated Feb. 24, 2016, U.S. Appl. No. 12/705,508, filed Feb. 12, 2010.

(56) References Cited

OTHER PUBLICATIONS

Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
Touch, J. et al., 'Transparent Interconnection of Lots of Links (TRILL): Problem and Applicability Statement', May 2009, Network Working Group, pp. 1-17.
'Switched Virtual Networks. Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Office Action dated Jun. 18, 2015, U.S. Appl. No. 13/098,490, filed May 2, 2011.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office Action dated Jun. 16, 2015, U.S. Appl. No. 13/048,817, filed Mar. 15, 2011.
Knight P et al: 'Layer 2 and 3 Virtual Private Networks: Taxonomy, Technology, and Standardization Efforts', IEEE Communications Magazine, IEEE Serivce Center, Piscataway, US, vol. 42, No. 6, Jun. 1, 2004 (Jun. 1, 2004), pp. 124-131, XP001198207, ISSN: 0163-6804, DOI:10.1109/MCOM.2004.1304248.
Office Action for U.S. Appl. No. 13/092,873, filed Apr. 22, 2011, dated Nov. 29, 2013.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', Brocade white paper, http://community.brocade.com/docs/DOC-2954, Dec. 3, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'Brocade Unveils 'The Effortless Network'', http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Knight, 'Network Based IP VPN Architecture using Virtual Routers', May 2003.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-na rten-n vo3-over l ay-problem-statement-01', Oct. 31, 2011.
Office Action for U.S. Appl. No. 13/092,752, filed Apr. 22, 2011, from Park, Jung H., dated Jul. 18, 2013.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/742,207 dated Jul. 24, 2014, filed Jan. 15, 2013.
Office Action for U.S. Appl. No. 12/725,249, filed Mar. 16, 2010, dated Apr. 26, 2013.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.

(56) References Cited

OTHER PUBLICATIONS

Office Action for U.S. Appl. No. 13/365,808, filed Jul. 18, 2013, dated Jul. 18, 2013.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
'RBridges: Base Protocol Specification', IETF Draft, Perlman et al., Jun. 26, 2009.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade 'An Introduction to Brocade VCS Fabric Technology', Dec. 3, 2012.
Huang, Nen-Fu et al., 'An Effective Spanning Tree Algorithm for a Bridged LAN', Mar. 16, 1992.
Lapuh, Roger et al., 'Split Multi-link Trunking (SMLT) draft-lapuh-network-smlt-08', Jan. 2009.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/030,688, filed Feb. 18, 2011, dated Jul. 17, 2014.

(56) References Cited

OTHER PUBLICATIONS

Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/950,974, filed Nov. 19, 2010, from Haile, Awet A., dated Dec. 2, 2012.
Office action for U.S. Appl. No. 12/725,249, filed Mar. 16, 2010, dated Sep. 12, 2012.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/044,301, dated Mar. 9, 2011.
Office Action for U.S. Appl. No. 13/087,239, filed Apr. 14, 2011, dated Dec. 5, 2012.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,887, dated Jan. 6, 2014.
Zhai F. Hu et al. 'RBridge: Pseudo-Nickname; draft-hu-trill-pseudonode-nickname-02.txt', May 15, 2012.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/425,238, filed Mar. 20, 2012, dated Mar. 12, 2015.
Office Action for U.S. Appl. No. 13/425,238, dated Mar. 12, 2015.
Office Action for U.S. Appl. No. 13/786,328, filed Mar. 5, 2013, dated Mar. 13, 2015.
Office Action for U.S. Appl. No. 14/577,785, filed Dec. 19, 2014, dated Apr. 13, 2015.
Rosen, E. et al., "BGP/MPLS VPNs", Mar. 1999.
Office action dated Jun. 8, 2015, U.S. Appl. No. 14/178,042, filed Feb. 11, 2014.
Office Action dated May 21, 2015, U.S. Appl. No. 13/288,822, filed Nov. 3, 2011.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated Apr. 1, 2015 U.S. Appl. No. 13/656,438, filed Oct. 19, 2012.
Office Action Dated Jun. 10, 2015, U.S. Appl. No. 13/890,150, filed May 8, 2013.
Mahalingam "VXLAN: A Framework for Overlaying Virtualized Layer 2 Networks over Layer 3 Networks" Oct. 17, 2013 pp. 1-22, Sections 1, 4 and 4.1.
Siamak Azodolmolky et al. "Cloud computing networking: Challenges and opportunities for innovations", IEEE Communications Magazine, vol. 51, No. 7, Jul. 1, 2013.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.2 Dec. 5, 2011.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.

\* cited by examiner

GLOBAL VLAN SERVICES

RELATED APPLICATIONS

This application claims the benefit of U.S. Provisional Application No. 62/031,746, titled "Spanning Tree Protocol in Fabric Switch Supporting Global VLAN" by inventors Chi L. Chong and Ganesh D. Venkata, filed 31 Jul. 2014, the disclosure of which is incorporated by reference herein.

The present disclosure is related to U.S. Pat. No. 8,867,552, titled "Virtual Cluster Switching," by inventors Suresh Vobbilisetty and Dilip Chatwani, issued 21 Oct. 2014; U.S. patent application Ser. No. 13/971,397, titled "Global VLANs for Fabric Switches," by inventors Suresh Vobbilisetty, Phanidhar Koganti, and Chi Lung Chong, filed 20 Aug. 2013; and U.S. Pat. No. 8,948,056, titled "Spanning-Tree Based Loop Detection for an Ethernet Fabric Switch," by inventors Tse Yu Lei, Ning Song, Vardarajan Venkatesh, and Mythilikanth Raman, issued 3 Feb. 2015, the disclosures of which are incorporated by reference herein.

BACKGROUND

Field

This disclosure relates to communication networks. More specifically, this disclosure relates to a system and method for extending virtualized networks.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as network virtualization and multi-tenancy, to accommodate diverse network demands efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 and layer-3 (e.g., Ethernet and Internet Protocol (IP), respectively) switching technologies continue to evolve. IP facilitates routing and end-to-end data transfer in wide area networks (WANs) while providing safeguards for error-free communication. On the other hand, more routing-like functionalities are migrating into layer-2. Notably, the development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

As Internet traffic is becoming more diverse, network virtualization is becoming progressively more important as a value proposition for network architects. In addition, the evolution of virtual computing has made multi-tenancy attractive and, consequently, placed additional requirements on the network. For example, virtual servers are being allocated to a large number of tenants while a respective tenant operates multiple virtualized networks. It is often desirable that the network infrastructure can provide a large number of virtualized network to support multi-tenancy and ensure network separation among the tenants.

While today's networks support many desirable features, some issues remain unsolved in efficiently facilitating virtualized networks across multiple networks.

SUMMARY

One embodiment of the present invention provides a switch in a network of interconnected switches. The switch includes a forwarding domain apparatus and a forwarding apparatus. The forwarding domain apparatus maintains a mapping between a first virtual local area network (VLAN) identifier and a first global VLAN identifier in a local storage device. The global VLAN identifier represents a layer-2 forwarding domain in the network and is distinct from a customer VLAN or a service-provider VLAN. The mapping is independent of a type of the VLAN identifier. During operation, the forwarding apparatus encapsulates a first packet belonging to the first VLAN in a network encapsulation header. The encapsulated packet is forwardable in the network based on the network encapsulation header. The forwarding apparatus includes the first global VLAN identifier in the network encapsulation header of the first packet.

In a variation on this embodiment, the mapping maps the first VLAN identifier to an internal identifier, and maps the internal identifier to the first global VLAN identifier. The internal identifier is internal and local to the switch, and is distinct from a VLAN identifier.

In a further variation, the internal identifier and the first global VLAN identifier are specified in a port profile comprising a media access control (MAC) address. In response to identifying the MAC address as a source address in a packet, the forwarding domain apparatus applies the port profile to a local ingress port of the packet.

In a variation on this embodiment, the global VLAN is represented by a first set of bits in a first header field and a second sets of bits in second header field in the network encapsulation header in a continuous representation.

In a variation on this embodiment, the forwarding domain apparatus maintains a mapping between a second VLAN identifier and the first global VLAN identifier. The first and second VLAN identifiers are associated with a same service level for a tenant.

In a further variation, the forwarding apparatus includes the first global VLAN identifier in a network encapsulation header of a packet in response to identifying the first or second VLAN identifier in the packet.

In a variation on this embodiment, a local port operates as a network extension interface for a second packet, which includes a tag representing the first global VLAN identifier. The network extension interface couples a second network of interconnected switches.

In a further variation, the switch also includes a tunnel management apparatus, which encapsulates the second packet in a tunnel encapsulation header. The network extension interface is a tunnel interface. The tunnel encapsulation header is distinct from the network encapsulation header.

In a variation on this embodiment, the switch also includes a spanning tree apparatus, which identifies a spanning tree instance associated with the first VLAN identifier and associates the spanning tree instance with the first global VLAN identifier.

In a further variation, the spanning tree apparatus associates the spanning tree instance with a local port in response to identifying the local port as being configured with the first global VLAN identifier.

BRIEF DESCRIPTION OF THE FIGURES

In the figures, like reference numerals refer to the same figure elements.

DETAILED DESCRIPTION

Figure 1A:
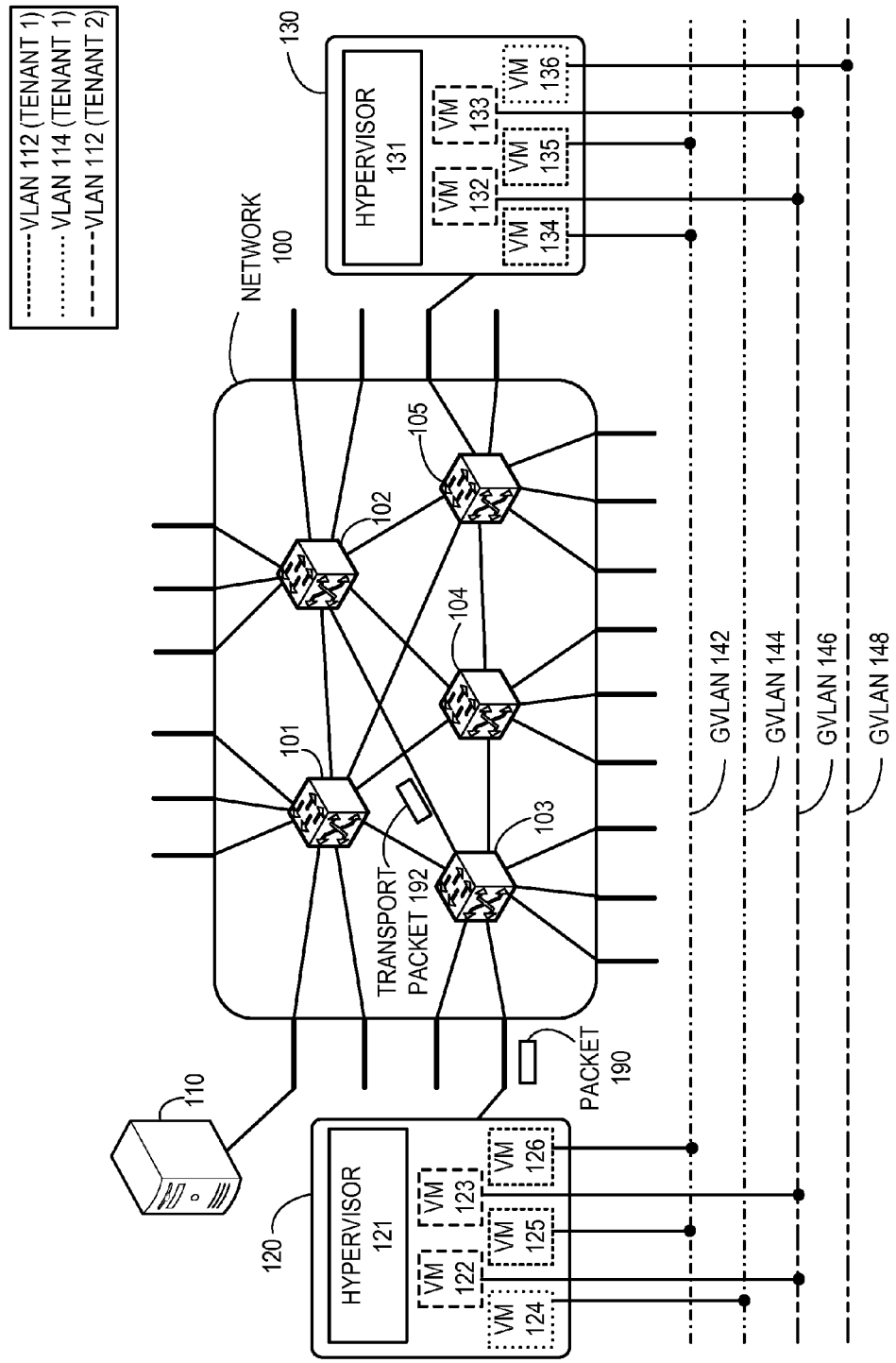
FIG. 1A illustrates an exemplary network with support for global virtual local area networks (VLANs), in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of facilitating large-scale network virtualization in a multi-tenant network is solved by representing tenant virtual local area networks (VLANs) as global VLANs (GVLANs) in the network. The network includes a number of interconnected member switches. A global VLAN has a larger identifier space, and thus can accommodate a plurality of VLANs of a plurality of tenants. The same VLAN of different tenants can map to different global VLANs in the member switches, thereby allowing different tenants to use the full range of VLANs.

Typically, a tenant (e.g., a client or customer) deploys a plurality of end devices (e.g., physical servers or virtual machines) belonging to different VLANs (e.g., Institute of Electrical and Electronics Engineers (IEEE) 802.1Q VLANs). Since the network can serve a plurality of tenants, each deploying a number of VLANs, a respective member switch of the network can serve a plurality of tenants while a plurality of member switches can serve the same tenant. Furthermore, a tenant can deploy its end devices across different member switches of the network. As a result, a network requires a large number of VLANs which can represent a respective VLAN of a respective tenant within the network. With existing technologies, the total number of VLANs a network can support for a tenant is limited by the number of bits dedicated for a VLAN identifier. Furthermore, a plurality of VLANs of a tenant may need a similar set of operations in the network. As a result, individual processing of these VLANs at the network switches occupies additional resources in the switches.

To solve this problem, the switches in the network use global VLANs to represent VLANs of different tenants in the network. A global VLAN creates a virtual forwarding domain within the network. Typically, a global VLAN is mapped based on a set of classification rules of a member switch. The classification rules can map a tenant VLAN to a global VLAN based on a tenant VLAN identifier and/or a media access control (MAC) address of an end device. In some embodiments, these classification rules can be local for a member switch and/or an edge port. This allows different sets of classification rules at different member switches and/or ports of the network. It should be noted that the end devices associated with the same global VLAN remain within the same forwarding domain even though the corresponding switches use different classification rules. Furthermore, if a group of VLANs of a tenant are associated with a same service level (e.g., run the same tenant application), the member switches in the network map that VLAN group to a same global VLAN. As a result, resources for maintaining the global VLAN mappings can be reduced at the switches.

In some embodiments, a global VLAN can support Internet Protocol (IP) routing. A global VLAN then can be associated with an IP sub-network (subnet) and can operate as a logical layer-3 interface assigned with an IP address from the subnet in a respective switch. A respective switch can maintain a mapping between the global VLAN and the corresponding subnet. In some embodiments, the layer-3 interface operates as a default gateway for the corresponding global VLAN and is assigned a virtual IP address, which is consistent in a respective switch. Because the layer-3 interface is associated with the same virtual IP address in a respective switch, the layer-3 interface operates as a distributed layer-3 gateway, and can operate as a tunnel endpoint to forward traffic across the network.

In some embodiments, the network is a fabric switch. In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an IP routing-capable switch (e.g., an IP router).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified by a fabric identifier (e.g., a VCS identifier), which is assigned to the fabric switch. A respective member switch of the fabric switch is associated with the fabric identifier. Furthermore, when a member switch of a fabric switch learns a media access control (MAC) address of an end device (e.g., via layer-2 MAC address learning), the member switch generates a notification message, includes the learned MAC address in the payload of the notification message, and sends the notification message to all other member switches of the fabric switch. In this way, a learned MAC address is shared with a respective member switch of the fabric switch.

In this disclosure, the term "fabric switch" refers to a number of interconnected physical switches which form a single, scalable logical switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

Although the present disclosure is presented using examples based on an encapsulation protocol, embodiments of the present invention are not limited to networks defined using one particular encapsulation protocol associated with a particular Open System Interconnection Reference Model (OSI reference model) layer. For example, embodiments of the present invention can also be applied to a multi-protocol label switching (MPLS) network. In this disclosure, the term "encapsulation" is used in a generic sense, and can refer to encapsulation in any networking layer, sub-layer, or a combination of networking layers.

The term "end device" can refer to any device external to a network (e.g., which does not perform forwarding in that network). Examples of an end device include, but are not limited to, a physical or virtual machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the network. An end device hosting one or more virtual machines can be referred to as a host machine. In this disclosure, the terms "end device" and "host machine" are used interchangeably.

The term "hypervisor" is used in a generic sense, and can refer to any virtual machine manager. Any software, firmware, or hardware that creates and runs virtual machines can be a "hypervisor." The term "virtual machine" is also used in a generic sense and can refer to software implementation of a machine or device. Any virtual device which can execute a software program similar to a physical device can be a "virtual machine."

The term "VLAN" is used in a generic sense, and can refer to any virtualized network. Any virtualized network comprising a segment of physical networking devices, software network resources, and network functionality can be can be referred to as a "VLAN." "VLAN" should not be interpreted as limiting embodiments of the present invention to layer-2 networks. "VLAN" can be replaced by other terminologies referring to a virtualized network or network segment, such as "Virtual Private Network (VPN)," "Virtual Private LAN Service (VPLS)," or "Easy Virtual Network (EVN)."

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/ rfc6325, which is incorporated by reference herein. Embodiments of the present invention are not limited to application among RBridges. Other types of switches, routers, and forwarders can also be used.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

Network Architecture

FIG. 1A illustrates an exemplary network with support for global VLANs, in accordance with an embodiment of the present invention. As illustrated in FIG. 1A, a network 100 includes member switches 101, 102, 103, 104, and 105. Network 100 can be a TRILL network and a respective member switch, such as switch 105, can be a TRILL RBridge. Network 100 can also be an IP network and a respective member switch, such as switch 105, can be an IP-capable switch, which calculates and maintains a local IP routing table (e.g., a routing information base or RIB), and is capable of forwarding packets based on its IP addresses. In some embodiments, network 100 is a fabric switch, and one or more switches in fabric switch 100 can be virtual switches (e.g., a software switch running on a computing device).

Switches 103 and 105 are coupled to end devices 120 and 130, respectively. End devices 120 and 130 are host machines, each hosting a plurality of virtual machines. Member switches in network 100 use edge ports to communicate with end devices and inter-switch ports to communicate with other member switches. For example, switch 103 is coupled to end devices, such as end device 120, via edge ports and to switches 101, 102, and 104 via inter-switch ports. End devices 120 and 130 include hypervisors 121 and 131, respectively. Virtual machines (VMs) 122, 123, 124, 125, and 126 run on hypervisor 121, and virtual machines 132, 133, 134, 135, and 136 run on hypervisor 131.

In this example, virtual machines 124, 125, 126, 134, 135, and 136 belong to a tenant 1 and virtual machines 122, 123, 132, and 133 belong to a tenant 2. Tenant 1 deploys VLANs 112 and 114, and tenant 2 deploys VLAN 112. Hence, the same VLAN identifier for VLAN 112 can be used by multiple tenants. Virtual machines 125, 126, 134, and 135 are in VLAN 112 of tenant 1, virtual machines 124 and 136 are in VLAN 114 of tenant 1, and virtual machines 122, 123, 132, and 133 are in VLAN 112 of tenant 2. Since network 100 is serving a plurality of tenants, each deploying a plurality of VLANs, a respective member switch of network 100 can serve both tenants 1 and 2, and a plurality of member switches can serve the same tenant 1 or 2.

With existing technologies, the total number of VLANs network 100 can support for tenant 1 or 2 is limited by the number of bits dedicated for a VLAN identifier (e.g., 12 bits in an IEEE 802.1Q tag). On the other hand, if tenant 1 or 2 does not need a large number of VLANs, the same number of bits, though unused, remains dedicated for that tenant. If an additional VLAN identifier (e.g., an IEEE 802.1ad tag or TRILL Fine Grain Labels (FGL)) is incorporated in a packet to identify tenant 1 or 2 in network 100, the number of tenants is limited by the number of bits dedicated for the additional VLAN identifier (e.g., an additional 12 bits in the 802.1ad tag).

To overcome this issue, a respective member switch in network 100 supports a corresponding global VLAN that represents a respective tenant VLAN in network 100. A global VLAN creates a virtual forwarding domain within network 100. A global VLAN is distinct from a customer VLAN, as represented by a C-tag, or a service-provider VLAN, as represented by an S-tag. Typically, a global VLAN is mapped based on a set of classification rules in the member switches of network 100. For example, the classification rules can map tenant VLAN 112 to a global VLAN 142 based on a VLAN identifier, a virtual MAC address and an ingress port identifier of virtual machine 125. In this example, VLAN 112 of tenant 1 is mapped to global VLAN 142 in switches 103 and 105.

In some embodiments, the classification rules are local to a member switch (or a port) of network 100 and a respective member switch can maintain its own mapping for global VLANs. For example, VLAN 114 of tenant 1 is mapped to global VLAN 144 in switch 103 and to global VLAN 148 in switch 105. On the other hand, VLAN 112 of tenant 2 is mapped to global VLAN 146 in switches 103 and 105. In this way, the same VLAN of the same tenant can be mapped to different global VLANs in different switches of network 100, and the same VLAN of different tenants can be mapped to different global VLANs in network 100.

Switch 103 maps VLAN 114 of tenant 1 to global VLAN 144 based on the VLAN identifier of VLAN 114. On the other hand, switch 105 maps VLAN 114 of tenant 1 to global VLAN 148 based on the virtual MAC address of virtual machine 136. This allows different sets of classification rules at different member switches and/or ports of the network. Furthermore, the classification rules can also be port-specific. For example, the mapping between VLAN 114 of tenant 1 and global VLAN 144 based on the VLAN identifier of VLAN 114 can be specific to the edge port coupling end device 120. Another edge port of switch 103 can have a different set of classification rules.

Similarly, switch 103 can map VLAN 112 of tenant 2 to global VLAN 146 based on the VLAN identifier of VLAN 112. On the other hand, switch 105 can map VLAN 112 of tenant 2 to global VLAN 146 based on the virtual MAC address of virtual machine 132. It should be noted that since virtual machines 122 and 132 are associated with the same global VLAN 146, virtual machines 122 and 132 remain within the same forwarding domain even when switches 103 and 105 use different classification rules.

In network 100, a classification rule can map a VLAN to an internal identifier in a switch (e.g., switch 103). An internal identifier is internal and local to switch 103, and its scope may not extend beyond switch 103. The internal identifier is for internal processing of switch 103 and is not included in a packet. Switch 103 further maps an internal identifier to a global VLAN and/or an egress port. Upon receiving a packet, switch 103 determines an internal identifier based on one or more fields of the packet and/or an ingress port of the packet (e.g., based on the classification rule). Based on the internal identifier, switch 103 determines a global VLAN identifier and an egress port for the packet.

In some embodiments, a respective global VLAN in network 100 is represented using the combined bits dedicated for both tenant and additional VLAN identifiers in a flat (e.g., a continuous and non-hierarchical) representation. Suppose that a tenant VLAN identifier is represented by A bits and an additional VLAN identifier is represented by B bits. In some embodiments, a respective global VLAN in network 100 is identified by a global VLAN identifier represented by the combined bits of A.B (e.g., a concatenation) in a flat representation. Starting from the most significant bit (MSB), any number of bits in A.B can be used to represent a tenant, and can include a subset of continuous bits in A from the MSB, or all bits of A and a subset of adjacent bits in B. The rest of the bits of A.B can be used to distinctly represent a respective global VLAN for the tenant. The length of A and B can be 12 bits each (e.g., IEEE 802.1ad tag or TRILL FGL). This flat A.B representation provides a 24-bit identifier space for global VLANs in network 100. This facilitates support for up to 16 million virtual forwarding domains in network 100, which surpasses 4096 VLANs supported by an 802.1q VLAN tag.

End devices 120 and 130 can run on different technologies. The way end device 120 or 130 identifies its VLAN domains varies with the link layer technology that the end device employs. As a result, a tenant's virtual machines may run on a heterogeneous pool of equipment. Network 100 should provide network connectivity to end devices 120 and 130 so that the resources are properly utilized. Global VLANs can normalize the forwarding domain within network 100 for end devices 120 and 130 even when end devices 120 and 130 have different VLAN representations at the respective edge ports coupling them.

In some embodiments, a packet forwarded via an inter-switch link in network 100 is encapsulated in an encapsulation header. The encapsulation header can be a fabric encapsulation header (e.g., an encapsulation header used to forward the packet in a fabric switch) or a tunnel header (e.g., an encapsulation header used to forward the packet via a tunnel). Examples of a fabric encapsulation header include, but are not limited to, a TRILL header, an IP header, an Ethernet header, and a combination thereof. Examples of a tunnel include, but are not limited to, Virtual Extensible Local Area Network (VXLAN); Generic Routing Encapsulation (GRE); and GRE variants, such as Network Virtualization using GRE (NVGRE) and openvSwitch GRE. The VLAN identifier of a global VLAN can be included in the encapsulation header.

Suppose that a tenant runs its virtual machines on three end devices, such as end devices 110, 120, and 130. Each of these end devices can use a different link layer technology or protocol. For example, end device 120 can run a virtual switch supporting traditional IEEE 802.1q in hypervisor 121 and end device 130 can run a virtual switch supporting Virtual Ethernet Port Aggregator (VEPA) (IEEE 802.1Qbg) in hypervisor 131. On the other hand, end device 110 can use an overlay network (e.g., a VXLAN tunnel). As a result, packets from end device 120 (e.g., from virtual machine 122) include a traditional VLAN identifier, packets from end device 130 (e.g., from virtual machine 132) include a double tag (e.g., a C-tag and an S-tag), and packets from end device 110 include a VXLAN Network Identifier (VNI).

A respective switch in network 100 can support mapping of each of these identifiers or tags to a corresponding global VLAN. For example, switch 103 can locally map a traditional VLAN identifier of VLAN 112 of tenant 1 to global VLAN 142. Similarly, switch 105 can locally map a double tag of VLAN 112 and tenant 1 to global VLAN 142. In this way, the switches of network 100 normalize different VLAN representations by mapping them into a single global VLAN domain at the ingress ports. When a packet leaves network 100, the egress switch can remove the encapsulation and restore the original packet.

During operation, virtual machine 122 sends a packet 190. Hypervisor 121 obtains packet 190 and sends it to switch 103. Upon receiving packet 190 via an edge port, switch 103 identifies that packet 190 belongs to VLAN 112 of tenant 2. Based on the local mapping, switch 103 determines that VLAN 112 of tenant 2 is mapped to global VLAN 146. Switch 103 encapsulates packet 190 in an encapsulation header to generate a transport packet 192. A packet used to transport traffic via an inter-switch link in network 100 can be referred to as a transport packet. Switch 103 includes the VLAN identifier of global VLAN 146 in the encapsulation header of packet 192 (e.g., in the A.B bits in the encapsulation header) and forwards packet 192 to switch 102. Upon receiving packet 192, switch 102 processes packet 192 based on its header information.

In some embodiments, switches in network 100 receive the mappings from a network manager. An end device 110, which is coupled to switch 101, can operate as a network manager. Examples of a network manager include, but are not limited to, VMWare vCenter, Citrix XenCenter, and Microsoft Virtual Machine Manager. A network administrator can configure the mapping from end device 110, which in turn, provides the mapping to switch 101. Switch 101 distributes the mapping to the corresponding member switch based on an internal information distribution service of network 100. Suppose that the network manager configures a mapping VLAN 112 of tenant 1 and global VLAN 142 for switch 103 from end device 110. Switch 101 receives the mapping and provides the mapping to switch 103.

In some embodiments, a respective member switch of network 100 (e.g., switch 103) runs a control plane with automatic configuration capabilities (e.g., based on IP or Fibre Channel (FC)) and forms a logical Ethernet switch based on the automatic configuration capabilities of the control plane. To an external end device, such as end device 110, network 100 can appear as a single Ethernet switch. Upon joining network 100 via the control plane, a respective member switch receives an automatically assigned identifier corresponding to the logical Ethernet switch. However, unlike an FC fabric, the data packets in network 100 can be encapsulated and forwarded based on another forwarding protocol. Examples of this forwarding protocol include, but are not limited to, Ethernet, TRILL, and IP. Furthermore, a respective member switch of network 100 can be associated with a group identifier, which identifies network 100 as a group of interconnected switches. If network 100 is a fabric switch, this group identifier can be a fabric identifier identifying the fabric switch.

In some embodiments, network 100 maintains a port profile for a respective virtual machine. A port profile represents Fibre Channel over Ethernet (FCoE) configuration, VLAN configuration, data center bridging (DCB) configuration, quality of service (QoS) configuration, and/or security configuration of one or more virtual machines. The VLAN configuration can include the global VLAN configuration for a virtual machine. The MAC address of a virtual machine associates the corresponding port profile to the virtual machine. This MAC address can be an original virtual MAC address (e.g., originally assigned by a hypervisor), a routable MAC address assigned as a virtual MAC address, or a routable MAC address mapped to the original virtual MAC address. Port profile management in a switch is specified in U.S. Patent Publication No. 2011/0299413, titled "Port Profile Management for Virtual Cluster Switching," the disclosure of which is incorporated herein in its entirety.

If a port profile is configured for a port, an internal identifier is allocated for a respective global VLAN defined in the port profile. This allows a switch to avoid allocation of an internal identifier when a switch learns a new MAC address that is already specified in a port profile. In this way, the internal identifiers of the switch can have better scalability. Furthermore, before the new MAC address is learned at the switch, the correct global VLAN for that MAC address becomes configured. As a result, the initial flooding of an unknown address would be forwarded via the correct VLAN.

In some embodiments, global VLANs support private VLAN (PVLANs). A global VLAN can be a primary or a secondary VLAN for a PVLAN. The classification rules of a VLAN can specify the type and its association. For example, if global VLAN 142 is a primary VLAN, the classification rules specify the PVLAN type. Based on the PVLAN type, the classification is done at a respective port. If an end device is coupled with network 100 via a trunked port (i.e., participating in a trunked link), the port may only allow secondary VLANs.

Figure 1B:
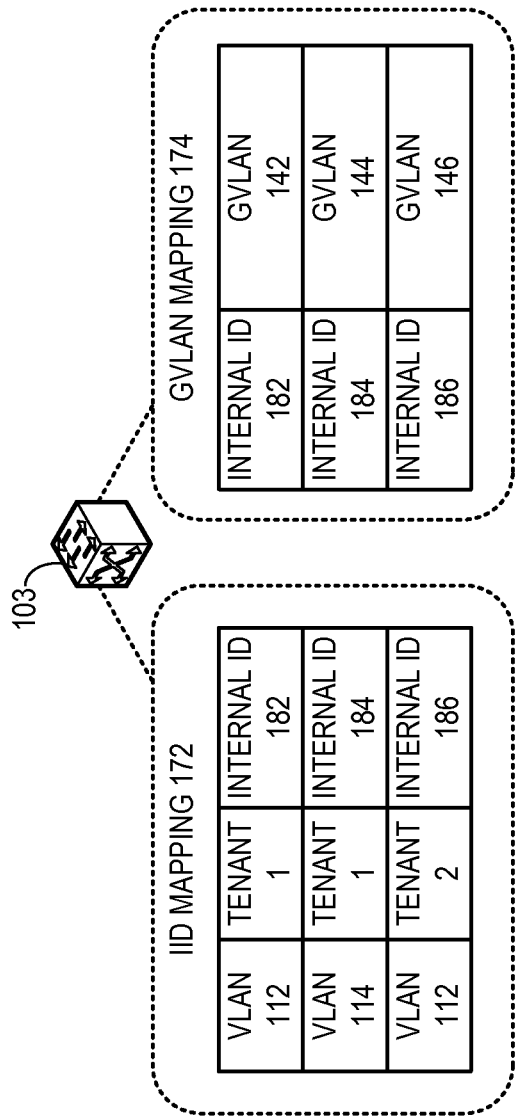
FIG. 1B illustrates exemplary mappings of VLANs to global VLANs, in accordance with an embodiment of the present invention.

FIG. 1B illustrates exemplary mappings of VLANs to global VLANs, in accordance with an embodiment of the present invention. In this example, switch 103 maintains an internal identifier mapping 172 (e.g., in a table, which can be a database table in a local persistent storage). An entry in mapping 172 maps one or more fields of a packet header to an internal identifier. This identifier is internal and local to switch 103, and not included in a packet in network 100. Mapping 172 maps VLANs 112 and 114 of tenant 1, and corresponding tenant information, to internal identifiers 182 and 184, respectively, and VLAN 112 of tenant 2, and corresponding tenant information, to internal identifier 186. Examples of the tenant information include, but are not limited to, a tenant identifier, an IP subnet, a MAC address (e.g., the virtual MAC address of a virtual machine belonging to the tenant), an ingress port, and a combination thereof.

Switch 103 also includes a global VLAN mapping 174. An entry in mapping 174 maps an internal identifier to a corresponding global VLAN. Mapping 174 maps internal identifiers 182 and 184 to global VLANs 142 and 144, respectively, and internal identifier 186 to global VLAN 146. In some embodiments, internal identifiers 182, 184, and 186 in switch 103 are mapped to one or more corresponding egress ports, which can be included in mapping 174 or maintained separately. If the header information of an ingress packet matches an internal identifier, switch 103 forwards that packet via the corresponding egress port. In the example in FIG. 1A, upon receiving packet 190, switch 103 determines an internal identifier based on one or more fields and/or an ingress port, retrieves an egress port mapped to the internal identifier, and forwards the packet accordingly.

Network Extensions

Figure 2A:
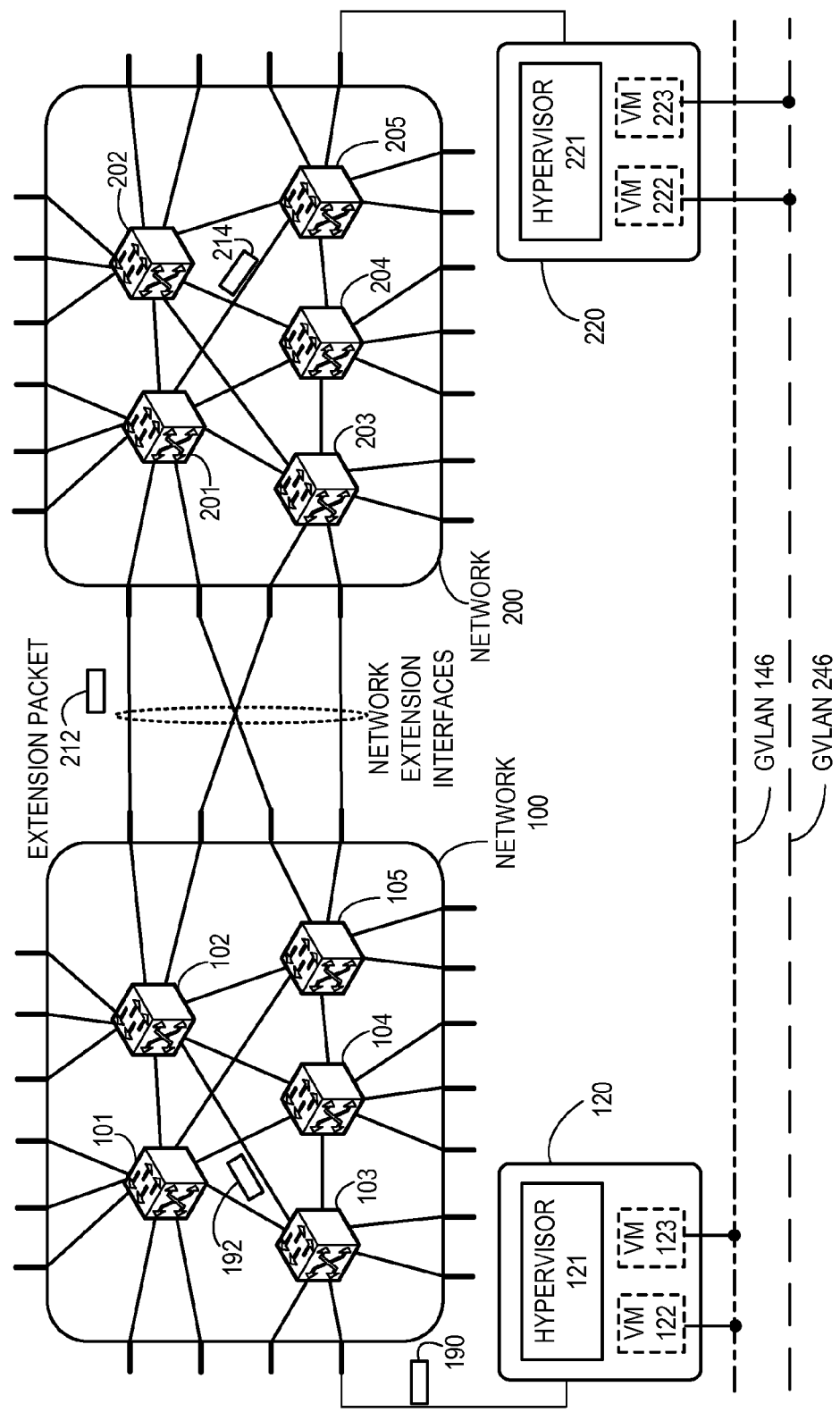
FIG. 2A illustrates an exemplary directly coupled network extension with support for global VLANs, in accordance with an embodiment of the present invention.

FIG. 2A illustrates an exemplary directly coupled network extension with support for global VLANs, in accordance with an embodiment of the present invention. In this example, network 100 is coupled to network 200, which includes member switches 201, 202, 203, 204, and 205. Network 200 can be a TRILL network and a respective member switch, such as switch 205, can be a TRILL RBridge. Network 200 can also be an IP network and a respective member switch, such as switch 205, can be an IP-capable switch, which calculates and maintains a local IP routing table (e.g., a routing information base or RIB), and is capable of forwarding packets based on its IP addresses. In some embodiments, network 200 is a fabric switch, and one or more switches in fabric switch 200 can be virtual switches (e.g., a software switch running on a computing device).

Switch 205 is coupled to end device 220. Member switches in network 200 use edge ports to communicate with end devices and inter-switch ports to communicate with other member switches. For example, switch 205 is coupled to end devices, such as end device 220, via edge ports and to switches 201, 202, and 204 via inter-switch ports. Host machine 220 includes hypervisor 221. Virtual machines 222 and 223 run on hypervisor 221 and belong to tenant 2. Virtual machines 222 and 223 are in VLAN 112 of tenant 2. In this example, VLAN 112 of tenant 2 is mapped to global VLAN 246 in network 200.

Suppose that packet 190 is destined to virtual machine 222 in host machine 220 coupled to network 200. With existing technologies, when transport packet 192, which includes packet 190 in its payload, reaches switch 102, switch 102 removes the encapsulation header, extracts packet 190, and forwards packet 190 to network 200 (e.g., either to switch 201 or 203). As a result, packet 190 can only carry the identifier (e.g., 12 bits in an IEEE 802.1Q tag) of tenant VLAN 112. Hence, the total number of VLANs a port of switch 102 coupling network 200 can support for tenant 1 is limited by the number of bits dedicated for the VLAN identifier.

To solve this problem, interconnections between networks 100 and 200 are established via network extension interfaces. Through network extension interfaces, global VLAN 146 in network 100 and global VLAN 246 in network 200 are translated at the network extension interfaces to form a unified layer-2 forwarding domain (e.g., a unified VLAN domain).

The network extension interfaces between networks 100 and 200 can be one or more pseudo-QinQ (i.e., IEEE 802.1ad) interfaces. The pseudo QinQ-interface may not support explicit S-tag configuration. Instead, a respective packet forwarded via the network extension interfaces includes the QinQ double tagging to indicate a global VLAN identifier. A respective switch in network 100 maintains a mapping between a global VLAN identifier and a corresponding QinQ double tag (e.g., S-tag and C-tag) for the packets leaving network 100. Similarly, a respective switch in network 200 maintains a mapping between a global VLAN identifier and a corresponding QinQ double tag for the packets leaving network 200.

In some embodiments, a respective network maintains separate global VLAN mappings. For example, VLAN 112 of tenant 1 is mapped to global VLAN 146 in network 100 and to global VLAN 246 in network 200. As a result, even though global VLANs 146 and 246 are part of the same layer-2 forwarding domain, they have separate global VLAN identifiers. Switches participating in the network extension interfaces can maintain a mapping between a remote QinQ double tag and the corresponding local global VLAN identifier. Upon receiving a packet, such a switch can translate the QinQ double tag of the packet to a local global VLAN identifier.

Switch 102 can include a QinQ double tag associated with global VLAN 146 in the header of packet 190 to generate an extension packet 212. A packet sent via the network extension interfaces can be referred to as an extension packet. Switch 102 then forwards packet 212 to network 200. Suppose that switch 201 receives packet 212. Upon detecting the QinQ double tag in its header, switch 201 identifies the corresponding VLAN identifier of global VLAN 246. Switch 201 strips the QinQ double tag from packet 212 to obtain packet 190. Switch 201 encapsulates packet 190 in an encapsulation header to generate transport packet 214, includes the VLAN identifier of global VLAN 246 in the encapsulation header, and forwards packet 214 to switch 205. In this way, network extension interfaces facilitate a unified layer-2 forwarding domain spanning networks 100 and 200.

Figure 2B:
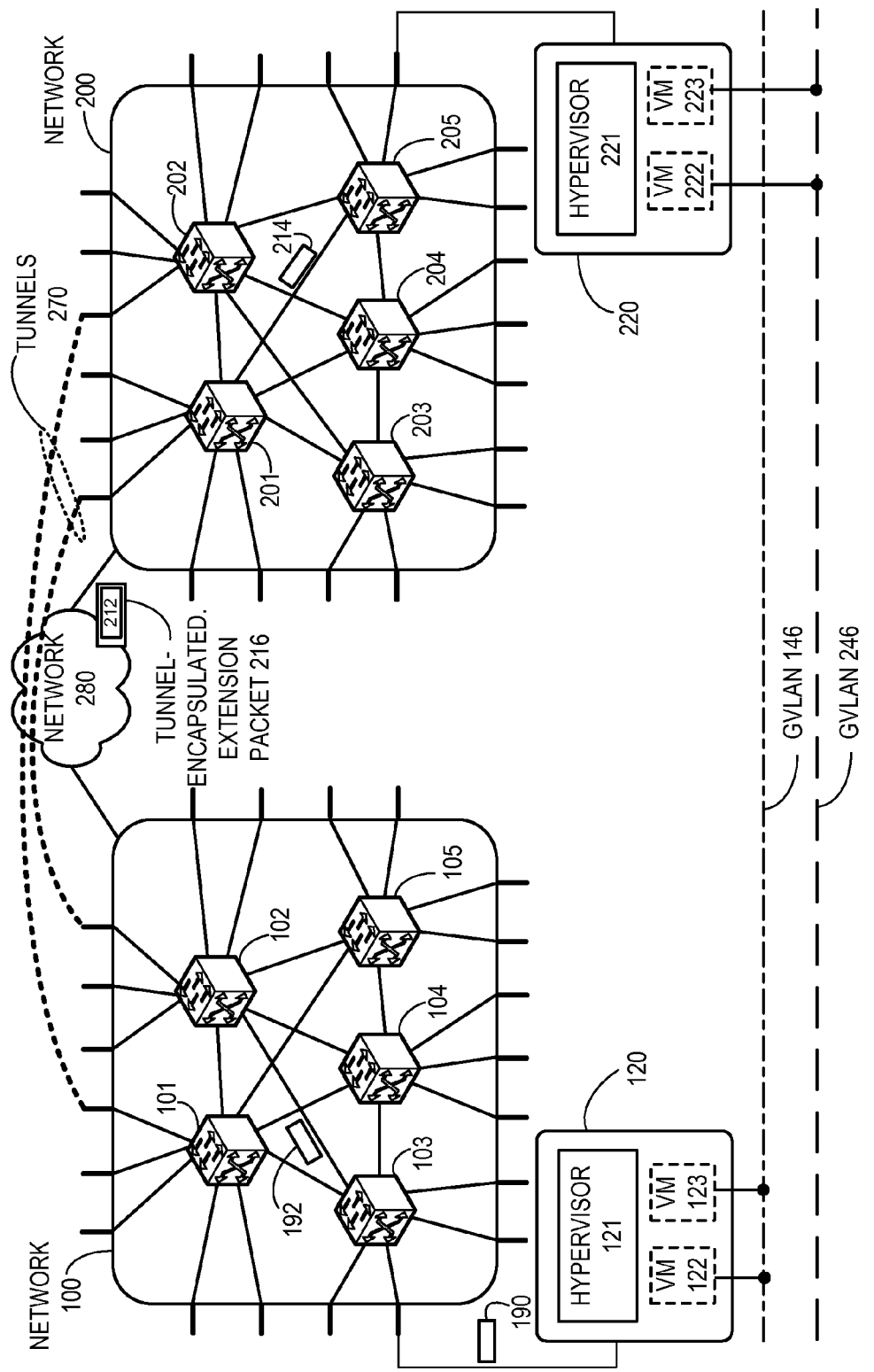
FIG. 2B illustrates an exemplary tunnel-based network extension with support for global VLANs, in accordance with an embodiment of the present invention.

In some embodiments, a network extension interface can be a tunnel interface. FIG. 2B illustrates an exemplary tunnel-based network extension with support for global VLANs, in accordance with an embodiment of the present invention. In this example, networks 100 and 200 are coupled via a layer-3 network 280. Hence, the network extension interfaces of networks 100 and 200 are tunnel interfaces (e.g., a VXLAN or NVGRE tunnel interface). One or more switches of network 100 establish corresponding tunnels 270 with one or more switches of network 200 via network 280.

Upon generating extension packet 212, which includes the QinQ double tag, switch 102 encapsulates packet 212 in a tunnel encapsulation header (e.g., a VXLAN or NVGRE header) to generate tunnel-encapsulated extension packet 216. Suppose that switch 201 of network 200 is the remote tunnel endpoint of the tunnel. Switch 102 sets the switch identifier (e.g., an IP address) of switch 201 as the destination switch identifier of the tunnel encapsulation header, identifies the local port associated with the tunnel interface, and forwards packet 216 via the port. Switch 201 receives packet 216, identifies the local switch as the destination switch, and decapsulates the tunnel encapsulation header to obtain packet 212. Switch 201 then processes packet 212 based on the QinQ double tag, as described in conjunction with FIG. 2A.

In some embodiments, a global VLAN can support Internet Protocol (IP) routing and can be associated with an IP subnet. A global VLAN can operate as a logical layer-3 interface assigned with an IP address, which can be a virtual IP address, from the subnet in switches 101 and 102. Switches 101 and 102 can maintain a mapping between the global VLAN and the corresponding subnet. In some embodiments, the layer-3 interface operates as a default gateway for a respective global VLAN. Because the layer-3 interface is associated with the same virtual IP address in switches 101 and 102, the layer-3 interface operates as a distributed layer-3 gateway, and can operate as the tunnel endpoint address for the tunnels between networks 100 and 200.

Transparent Global VLANs

Figure 3:
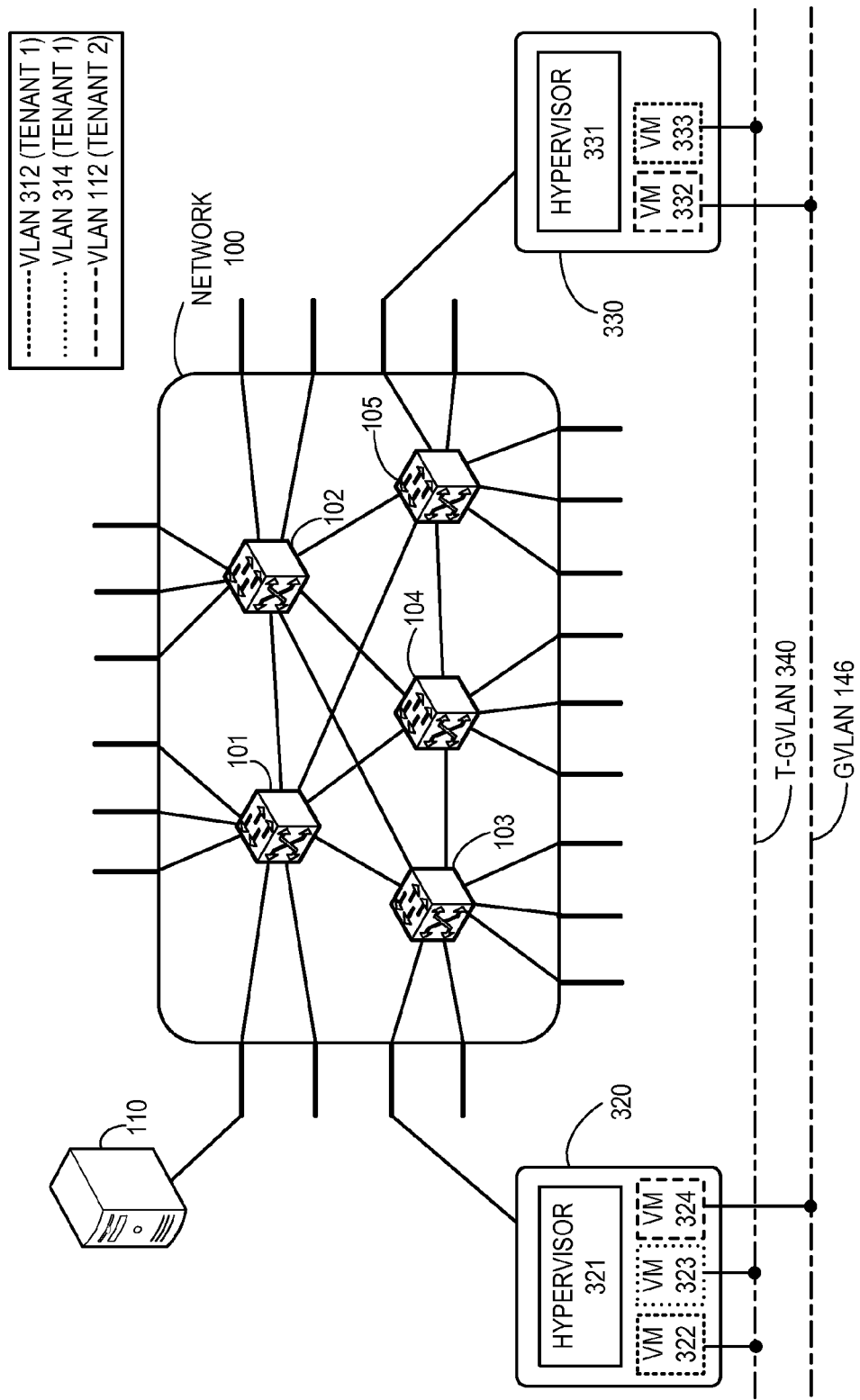
FIG. 3 illustrates an exemplary network with support for transparent global VLANs, in accordance with an embodiment of the present invention.

If a group of VLANs of a tenant are associated with a same service level (e.g., run the same tenant application), the member switches in the network map that VLAN group to a same global VLAN. This global VLAN can be referred to as a transparent global VLAN (T-GVLAN). FIG. 3 illustrates an exemplary network with support for transparent global VLANs, in accordance with an embodiment of the present invention. In this example, switches 103 and 105 are coupled to end devices 320 and 330, respectively. End devices 320 and 330 are host machines, each hosting a plurality of virtual machines.

End devices 320 and 330 include hypervisors 321 and 331, respectively. Virtual machines 322, 323, and 324 run on hypervisor 321, and virtual machines 332 and 333 run on hypervisor 331. Virtual machines 322 and 333 belong to VLAN 312 of tenant 1, virtual machine 323 belongs to VLAN 314 of tenant 1, and virtual machines 324 and 332 belong to VLAN 112 of tenant 2. Different service levels are needed to meet the requirements of a tenant. Transparent global VLANs facilitate a single layer-2 forwarding domain in network 100 for a VLAN group instead of an individual tenant VLAN. A VLAN group can represent a specific tenant application. The services associated with the transparent VLAN can collectively represent a respective VLAN in the VLAN group that participates in the tenant application.

Suppose that VLANs 312 and 314 are associated with a same service level (e.g., a Service Level Agreement (SLA) level). Hence, VLANs 312 and 314 can be mapped to a transparent global VLAN 340. VLANs 312 and 314 share the same layer-2 forwarding domain represented by transparent global VLAN 340 in network 100. As a result, flooding domains are not separated for VLANs 312 and 314. It should be noted that, since transparent global VLANs provide a layer-2 forwarding domain, respective virtual MAC addresses of virtual machines 322, 323, and 333 should be unique. Switches in network 100 may not maintain VLAN isolation for VLANs 112 and 114. On the other hand, VLAN 112 of tenant 2 is mapped to global VLAN 146. Hence, switches 103 and 105 can map some VLANs to global VLANs and some other VLANs to transparent global VLANs.

In some embodiments, a classification rule can map a range of tenant VLANs to a transparent global VLAN. A transparent global VLAN can also be configured for a trunk port. The trunk port can support coexistence of classification rules for both global VLANs and transparent global VLANs. However, a tenant VLAN can be mapped to either a global VLAN or a transparent global VLAN. It should be noted that, since a transparent global VLAN is associated with a plurality of VLANs, network 100 does not implement per-VLAN spanning trees for a transparent global VLAN.

Suppose that switch 103 receives a control packet via transparent global VLAN 340. Switch 103 determines whether the packet is tagged (i.e., includes a VLAN tag) or not. If the packet is an untagged packet, switch 103 processes the packet based on the corresponding protocol configuration (e.g. trap, drop, or forward). If the packet is a tagged packet, switch 103 forwards the packet similarly to a data packet. However, if the packet is received via global VLAN 146, switch 103 processes the packet based on the corresponding protocol configuration.

Initialization and Operations

Figure 4:
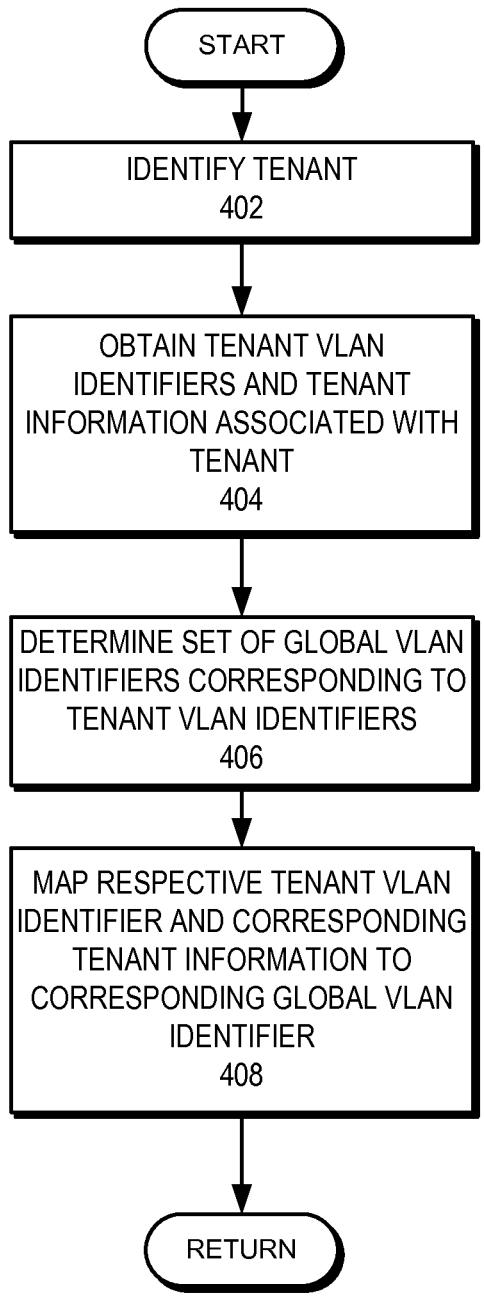
FIG. 4 presents a flowchart illustrating the process of a switch initializing global VLANs, in accordance with an embodiment of the present invention.

In the example in FIG. 1A, a respective member switch in network 100 initializes global VLANs 142, 144, and 146. FIG. 4 presents a flowchart illustrating the process of a switch initializing global VLANs, in accordance with an embodiment of the present invention. During operation, the switch identifies a tenant (operation 402). The switch then obtains tenant VLAN identifiers and tenant information associated with the tenant (operation 404). Tenant information includes one or more of: MAC addresses of tenant devices, port identifiers of ports coupling tenant devices, and IP subnets of the tenant. The switch determines a set of global VLAN identifiers corresponding to the tenant VLAN identifiers (operation 406). The switch then maps a respective tenant VLAN identifier and corresponding tenant information to a corresponding global VLAN identifier (operation 408).

Figure 5A:
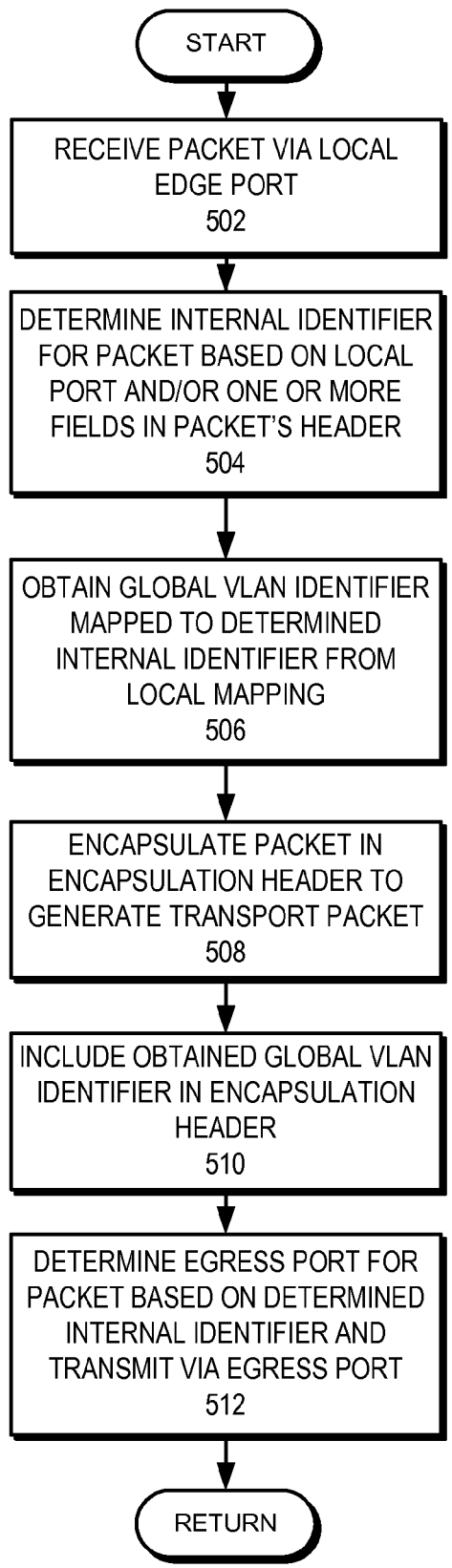
FIG. 5A presents a flowchart illustrating the process of a switch forwarding a packet received via an edge port based on global VLANs, in accordance with an embodiment of the present invention.

FIG. 5A presents a flowchart illustrating the process of a switch forwarding a packet received via an edge port based on global VLANs, in accordance with an embodiment of the present invention. During operation, the switch receives a packet via a local edge port (operation 502) and determines an internal identifier for the packet based on the local port (e.g., a port identifier) and/or one or more fields in the packet's header (operation 504). The switch obtains a global VLAN identifier mapped to the determined internal identifier from the local mapping (operation 506). The switch encapsulates the packet in an encapsulation header to generate a transport packet (operation 508) and includes the obtained global VLAN identifier in the encapsulation header (operation 510), as described in conjunction with FIG. 1A. The switch then determines an egress port for the packet based on the determined internal identifier and transmits the packet via the port (operation 512). If the packet is a multi-destination packet, a plurality of egress ports can be mapped to the internal identifier.

Figure 5B:
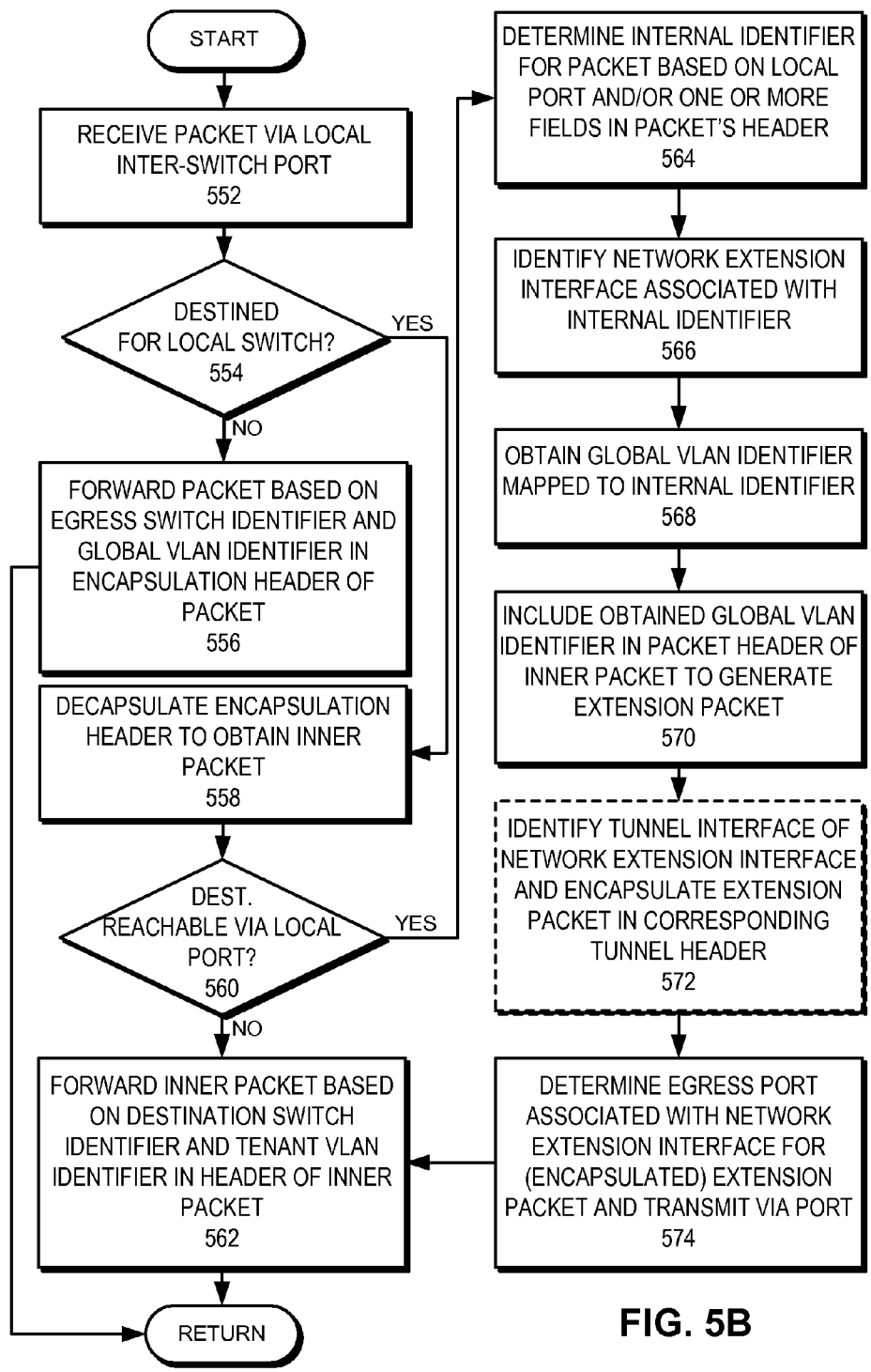
FIG. 5B presents a flowchart illustrating the process of a switch forwarding a packet received via an inter-switch port based on global VLANs, in accordance with an embodiment of the present invention.

FIG. 5B presents a flowchart illustrating the process of a switch forwarding a packet received via an inter-switch port based on global VLANs, in accordance with an embodiment of the present invention. During operation, the switch receives a packet via a local inter-switch port (operation 552) and checks whether the packet is destined for the local switch (operation 554). If the packet is not destined for the local switch, the switch forwards the packet based on the egress switch identifier and global VLAN identifier in the encapsulation header of the packet (operation 556). If the packet is destined for the local switch, the switch decapsulates the encapsulation header to obtain the inner packet (e.g., an Ethernet frame) (operation 558). This inner packet can be a tenant packet.

The switch then checks whether the destination address of the inner packet (e.g., a destination MAC address) is reachable via a local network extension interface (operation 560). If the destination of the inner packet is not reachable via a local network extension interface, the packet is for a device coupled via a local edge port. The switch then forwards the inner packet based on the destination switch identifier (e.g., the destination MAC address) and a tenant VLAN identifier in the header of the inner packet (operation 562). If the destination of the inner packet is reachable via a local network extension interface, the switch determines an internal identifier for the packet based on the local port (e.g., a port identifier) and one or more fields in the packet's header (operation 564).

The switch identifies a network extension interface associated with the internal identifier (operation 566) and obtains a global VLAN identifier mapped to the internal identifier (operation 568). The switch includes the obtained global VLAN identifier in the packet header of the inner packet (e.g., as a QinQ tag) to generate an extension packet (operation 570), as described in conjunction with FIG. 2A. If the network extension interface is a tunnel interface, the switch identifies the tunnel interface of the network extension interface and encapsulates the extension packet in a corresponding tunnel header (operation 572), as described in conjunction with FIG. 2B. The switch determines an egress port associated with the network extension interface for the (encapsulated) extension packet and transmits the packet via the port (operation 574).

Spanning Trees

Figure 6:
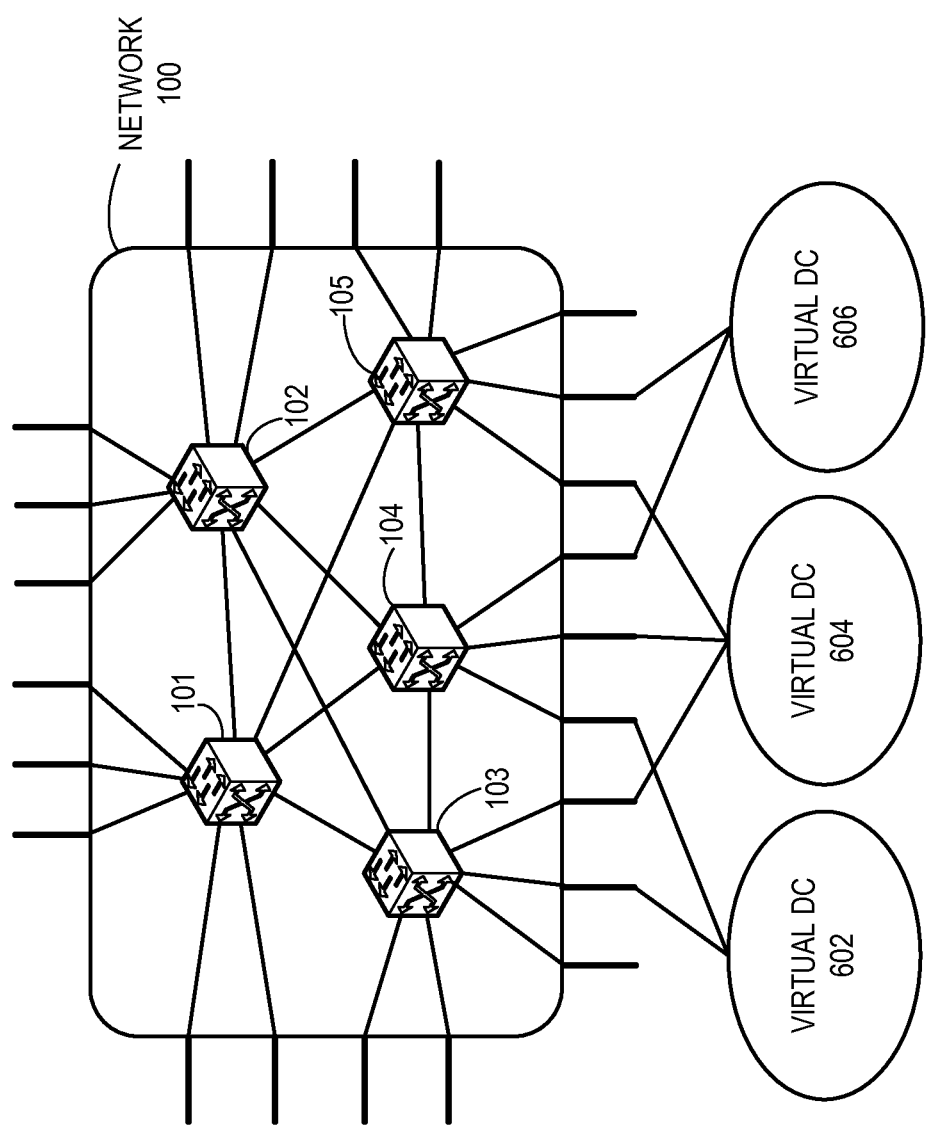
FIG. 6 illustrates an exemplary network with support for spanning trees over global VLANs, in accordance with an embodiment of the present invention.

In network 100, tenant VLANs are configured for edge ports and global VLANs are configured for inter-switch ports. Typically, network 100 supports only a single Spanning Tree Protocol (STP) domain of any variation of STP that sends untagged Bridge Protocol Data Units (BPDUs). Examples of such variations include, but are not limited to, Rapid Spanning Tree Protocol (RSTP) and Multiple Spanning Tree Protocol (MSTP). As a result, ports participating in an STP should include VLANs with identical configurations. FIG. 6 illustrates an exemplary network with support for spanning trees over global VLANs, in accordance with an embodiment of the present invention. In this example, network 100 is coupled to virtual data centers 602, 604, and 606. To establish loop-free communication via network 100, virtual data centers 602, 604, and 606 may not have any physical connectivity among them.

If the variant of STP is RSTP, each of virtual data centers 602, 604, and 606 can participate in the RSTP. It should be noted that an RSTP instance is unaware of a global VLAN. Network 100, operating as a single switch, forms a single RSTP topology with virtual data centers 602, 604, and 606.

Loops between network 100 and virtual data centers 602, 604, and 606 are detected by this RSTP topology. If a port of a switch in network 100 cannot participate in the RSTP instance (e.g., due to a configuration conflict), a user may configure that port to put it in a blocking state. The default state for a global VLAN can be "no blocking."

If the variant of STP is MSTP, switches in network 100 create a spanning tree instance for a group of VLANs in network 100, and virtual data centers 602, 604, and 606. The spanning instance should be the same in network 100 and virtual data centers 602, 604, and 606. Network 100, operating as a single switch, forms an MSTP topology for a respective MSTP instance with virtual data centers 602, 604, and 606. Loops between network 100 and virtual data centers 602, 604, and 606 are detected by this topology associated with the MSTP instance. If a port of a switch in network 100 cannot participate in an MSTP instance, a user may configure that port to put it in a blocking state. The default state for a global VLAN for that MSTP instance can be "no blocking."

For Per-VLAN Spanning Tree (PVST), switches in network 100 create a spanning tree instance for a respective global VLAN. Since network 100 participates in PVST instances with virtual data centers 602, 604, and 606, a PVST instance can be enabled for a global VLAN if the classification rule for that global VLAN includes a corresponding tenant VLAN. Virtual data centers 602, 604, and 606 participate in the PVST instance based on the tenant VLAN. It should be noted that the tenant VLAN should not conflict with other global VLAN configurations in network 100.

In some embodiments, a respective switch in network 100 runs an edge loop detection algorithm. A member switch of network 100 sends an edge loop detection packet for a respective global VLAN via a respective port associated with the global VLAN. If any switch in network 100 receives a loop detection packet originated from network 100, that switch detects a loop for that global VLAN.

Network 100 can use tunneling over a spanning tree. Since network 100 is a multi-tenant network, network 100 can participate in a spanning tree instance of any of the tenants. However, if network 100 only supports one spanning tree, only the ports associated with that spanning tree can provide tunneling over a spanning tree. Other ports may not support tunneling for the spanning tree. Hence, these ports should be removed from a corresponding global VLAN (i.e., removed from the corresponding layer-2 flooding domain).

Exemplary Switch

Figure 7:
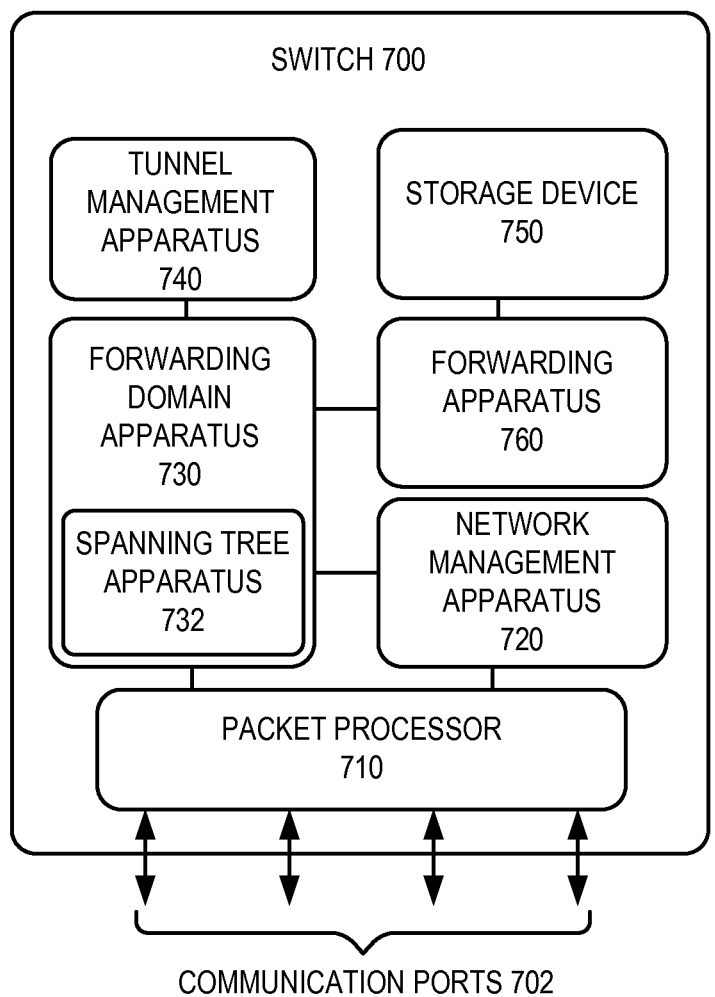
FIG. 7 illustrates an exemplary switch with support for global VLANs, in accordance with an embodiment of the present invention.

FIG. 7 illustrates an exemplary switch with support for global VLANs, in accordance with an embodiment of the present invention. In this example, a switch 700 includes a number of communication ports 702, a packet processor 710, a forwarding domain apparatus 730, a forwarding apparatus 760, and a storage device 750. In some embodiments, packet processor 710 adds an encapsulation header to a packet. In some embodiments, switch 700 includes a network management apparatus 720, which maintains a membership in a network of interconnected switches. A respective switch of the network is associated with a group identifier identifying the network.

In some embodiments, the network is a fabric switch. Switch 700 maintains a configuration database in storage 750 that maintains the configuration state of a respective switch within the fabric switch. Switch 700 maintains the state of the fabric switch, which is used to join other switches. Under such a scenario, communication ports 702 can include inter-switch communication channels for communication within a fabric switch. This inter-switch communication channel can be implemented via a regular communication port and based on any open or proprietary format (e.g., a TRILL or IP protocol).

Forwarding domain apparatus 730 maintains a mapping between a first VLAN identifier and a first global VLAN identifier in storage device 750. During operation, forwarding apparatus 760 encapsulates a first packet belonging to the first VLAN in a network encapsulation header and includes the first global VLAN identifier in the network encapsulation header of the first packet. The mapping can map the first VLAN identifier to an internal identifier and the internal identifier to the first global VLAN identifier. In some embodiments, if forwarding apparatus 760 identifies a MAC address as a source address in a packet, forwarding apparatus 760 applies a port profile comprising the MAC address, the internal identifier, and the first global VLAN identifier to the ingress port of the packet.

Forwarding domain apparatus 730 can maintain a mapping between a second VLAN identifier and the first global VLAN identifier. The first and second VLAN identifiers are in the same VLAN group and associated with a same service level for a tenant. If forwarding apparatus 760 identifies the first or second VLAN identifier in the packet, forwarding apparatus 760 includes the first global VLAN identifier in a network encapsulation header of a packet. In some embodiments, switch 700 also includes a tunnel management apparatus 740, which encapsulates an extension packet in a tunnel encapsulation header. Switch 700 can also include a spanning tree apparatus 732, which identifies a spanning tree instance associated with the first VLAN identifier and associates the spanning tree instance with the first global VLAN identifier. Spanning tree apparatus 732 associates the spanning tree instance with a local port in response to identifying the local port as being configured with the first global VLAN identifier.

Note that the above-mentioned modules can be implemented in hardware as well as in software. In one embodiment, these modules can be embodied in computer-executable instructions stored in a memory which is coupled to one or more processors in switch 700. When executed, these instructions cause the processor(s) to perform the aforementioned functions.

In summary, embodiments of the present invention provide a switch and a method for providing global VLAN services. In one embodiment, the switch is in a network of interconnected switches. The switch includes a forwarding domain apparatus and a forwarding apparatus. The forwarding domain apparatus maintains a mapping between a first VLAN identifier and a first global VLAN identifier in a local storage device. The global VLAN identifier represents a layer-2 forwarding domain in the network and is distinct from a customer VLAN or a service-provider VLAN. The mapping is independent of a type of the VLAN identifier. During operation, the forwarding apparatus encapsulates a first packet belonging to the first VLAN in a network encapsulation header. The encapsulated packet is forwardable in the network based on the network encapsulation header. The forwarding apparatus includes the first global VLAN identifier in the network encapsulation header of the first packet.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch in a network of interconnected switches, wherein the switch comprises:
   a storage device;
   forwarding domain circuitry configured to maintain a mapping that maps a first virtual local area network (VLAN) identifier and an internal virtual identifier to a first global VLAN identifier in the storage device, wherein the global VLAN identifier represents a layer-2 forwarding domain in the network of interconnected switches and is distinct from a customer VLAN or a service-provider VLAN, and wherein the internal virtual identifier is local and internal to the switch, and not included in a packet; and
   forwarding circuitry configured to:
   encapsulate a first packet belonging to the first VLAN in a network encapsulation header, wherein the encapsulated packet is forwardable in the network of interconnected switches based on the network encapsulation header; and include the first global VLAN identifier in the network encapsulation header encapsulating the first packet, wherein a set of bits representing the global VLAN identifier in the network encapsulation header indicates a single value.

2. The switch of claim 1, wherein the mapping further maps the internal identifier to an egress port associated with the first global VLAN identifier; and
wherein the internal identifier is distinct from a VLAN identifier.

3. The switch of claim 1, wherein the internal identifier and the first global VLAN identifier are specified in a port profile comprising a media access control (MAC) address, wherein the port profile represents a set of configurations for a port; and
wherein the forwarding domain circuitry is further configured to, in response to identifying the MAC address as a source address in a packet, apply the port profile to a local ingress port of the packet.

4. The switch of claim 1, wherein the set of bits representing the global VLAN identifier includes a first subset of bits in a first header field and a second subset of bits in a second header field in the network encapsulation header in a continuous representation indicating the single value.

5. The switch of claim 1, wherein the forwarding domain circuitry is further configured to maintain a second mapping between a second VLAN identifier and the first global VLAN identifier, wherein the first and second VLAN identifiers are associated with a same service level for a tenant.

6. The switch of claim 5, wherein the forwarding circuitry is further configured to include the first global VLAN identifier in a second network encapsulation header encapsulating a second packet in response to identifying the second VLAN identifier in the second packet.

7. The switch of claim 1, wherein the forwarding circuitry is further configured to determine a port of the switch as a network extension interface for a second packet, wherein the network extension interface is an egress port associated with a second network of interconnected switches, and wherein the second packet includes a tag representing the first global VLAN identifier.

8. The switch of claim 7, further comprising tunnel management circuitry configured to encapsulate the second packet in a tunnel encapsulation header, wherein the network extension interface is a tunnel interface, and wherein the tunnel encapsulation header is distinct from the network encapsulation header.

9. The switch of claim 1, further comprising spanning tree circuitry configured to:
identify a spanning tree instance associated with the first VLAN identifier; and
associate the spanning tree instance with the first global VLAN identifier.

10. The switch of claim 9, wherein the spanning tree circuitry is further configured to associate the spanning tree instance with a local port in response to identifying the local port as being configured with the first global VLAN identifier.

11. A computer-executable method, comprising:
maintaining a mapping that maps a first virtual local area network (VLAN) identifier and an internal virtual identifier to a first global VLAN identifier in a storage device of a switch in a network of interconnected switches, wherein the global VLAN identifier represents a layer-2 forwarding domain in the network of interconnected switches and is distinct from a customer VLAN or a service-provider VLAN, and wherein the internal virtual identifier is local and internal to the switch, and not included in a packet;
encapsulating a first packet belonging to the first VLAN in a network encapsulation header, wherein the encapsulated packet is forwardable in the network of interconnected switches based on the network encapsulation header; and
including the first global VLAN identifier in the network encapsulation header encapsulating the first packet, wherein a set of bits representing the global VLAN identifier in the network encapsulation header indicates a single value.

12. The method of claim 11, wherein the mapping further maps the internal identifier to an egress port associated with the first global VLAN identifier; and
wherein the internal identifier is distinct from a VLAN identifier.

13. The method of claim 11, wherein the internal identifier and the first global VLAN identifier are specified in a port profile comprising a media access control (MAC) address, wherein the port profile represents a set of configurations for a port; and
wherein the method further comprises, in response to identifying the MAC address as a source address in a packet, applying the port profile to a local ingress port of the packet.

14. The method of claim 11, wherein the set of bits representing the global VLAN identifier includes a first subset of bits in a first header field and a second subset of bits in a second header field in the network encapsulation header in a continuous representation indicating the single value.

15. The method of claim 11, further comprising maintaining a second mapping between a second VLAN identifier and the first global VLAN identifier, wherein the first and second VLAN identifiers are associated with a same service level for a tenant.

16. The method of claim 15, further comprising including the first global VLAN identifier in a second network encapsulation header encapsulating a second packet in response to identifying the second VLAN identifier in the second packet.

17. The method of claim 11, further comprising determining a port of the switch as a network extension interface for a second packet, wherein the network extension interface is an egress port associated with a second network of interconnected switches, and wherein the second packet includes a tag representing the first global VLAN identifier.

18. The method of claim 17, further comprising encapsulating the second packet in a tunnel encapsulation header, wherein the network extension interface is a tunnel interface, and wherein the tunnel encapsulation header is distinct from the network encapsulation header.

19. The method of claim 11, further comprising:
identifying a spanning tree instance associated with the first VLAN identifier; and
associating the spanning tree instance with the first global VLAN identifier.

20. The method of claim 19, further comprising associating the spanning tree instance with a local port in response to identifying the local port as being configured with the first global VLAN identifier.

21. A computing system, comprising:
a processor; and
a memory storing instructions that when executed by the processor cause the system to perform a method, the method comprising:

maintaining a mapping that maps a first virtual local area network (VLAN) identifier and an internal virtual identifier to a first global VLAN identifier in a storage device of a switch in a network of interconnected switches, wherein the global VLAN identifier represents a layer-2 forwarding domain in the network of interconnected switches and is distinct from a customer VLAN or a service-provider VLAN, and wherein the internal virtual identifier is local and internal to the switch, and not included in a packet;

encapsulating a first packet belonging to the first VLAN in a network encapsulation header, wherein the encapsulated packet is forwardable in the network of interconnected switches based on the encapsulation header; and including the first global VLAN identifier in the network encapsulation header encapsulating the first packet, wherein a set of bits representing the global VLAN identifier in the network encapsulation header indicates a single value.

* * * * *